(12) United States Patent
Ballester Muñoz et al.

(10) Patent No.: US 9,487,966 B2
(45) Date of Patent: Nov. 8, 2016

(54) SYSTEM AND METHOD FOR THE CONSTRUCTION OF CONCRETE TOWERS AND RESULTING CONCRETE TOWER

(71) Applicant: INGECID, INVESTIGACIÓN Y DESARROLLO DE PROYECTOS, S.L., Boo de Piélagos (ES)

(72) Inventors: Francisco Ballester Muñoz, Piélagos (ES); Jokin Rico Arenal, Piélagos (ES); Jorge Gil Fernández, Piélagos (ES); Francisco Manuel Díez Ramírez, Piélagos (ES); Alfonso González Fernández, Piélagos (ES); Marina Llama Vélez, Piélagos (ES); Julio César González Galván, Piélagos (ES)

(73) Assignee: INGECID, INVESTIGACIÓN Y DESARROLLO DE PROYECTOS, S.L., Piélagos (ES)

( * ) Notice: Subject to any disclaimer, the term of this patent is extended or adjusted under 35 U.S.C. 154(b) by 0 days.

(21) Appl. No.: 14/761,659

(22) PCT Filed: Feb. 4, 2014

(86) PCT No.: PCT/ES2014/070079
§ 371 (c)(1),
(2) Date: Jul. 17, 2015

(87) PCT Pub. No.: WO2014/122348
PCT Pub. Date: Aug. 14, 2014

(65) Prior Publication Data
US 2015/0361687 A1 Dec. 17, 2015

(30) Foreign Application Priority Data
Feb. 5, 2013 (ES) .................. P201330133

(51) Int. Cl.
*E04H 12/34* (2006.01)
*E04B 1/16* (2006.01)
(Continued)

(52) U.S. Cl.
CPC ............... *E04H 12/341* (2013.01); *E04B 1/16* (2013.01); *E04G 11/062* (2013.01); *E04H 12/12* (2013.01); *E04H 12/16* (2013.01); *E04H 12/185* (2013.01)

(58) Field of Classification Search
CPC ... E04H 12/341; E04H 12/16; E04G 11/062; E04G 11/065; E04G 11/16; E04G 11/08; E04G 11/20; E04G 11/22; E04G 11/24; E04B 1/16; E04B 1/166
USPC ....... 425/63, 64; 264/31, 32, 33, 34; 249/20, 249/21, 22, 33, 47; 52/245, 745.18, 222, 52/223.3, 223.4, 742.14, 745.07
See application file for complete search history.

(56) References Cited

U.S. PATENT DOCUMENTS

| 733,810 A | * | 7/1903 | Brown .................... E01D 21/00 249/1 |
| 1,389,817 A | * | 9/1921 | Deal ........................ B28B 7/02 249/156 |

(Continued)

FOREIGN PATENT DOCUMENTS

| CA | 1245877 A1 | 12/1968 |
| FR | 1295463 A | 6/1962 |

(Continued)

*Primary Examiner* — Robert Canfield
*Assistant Examiner* — Matthew Gitlin
(74) *Attorney, Agent, or Firm* — Stephen H. Eland; Dann, Dorfman, Herrell & Skillman (57) ABSTRACT

The system comprises a limited number of equal groups of formwork pieces, each group comprising: —intermediate pieces (1) of constant curvature and width along the entire length thereof and—end pieces (2) forming two symmetrical lateral corners of triangular or trapezoidal outline, with a curvature equal to that of the intermediate pieces. This system allows for forming, with the same groups of pieces, successive formwork segments of varying or constant section for building towers. The invention also includes a building method and the tower thus obtained.

6 Claims, 8 Drawing Sheets

(51) Int. Cl.
  *E04H 12/12* (2006.01)
  *E04H 12/18* (2006.01)
  *E04G 11/06* (2006.01)
  *E04H 12/16* (2006.01)

(56) References Cited

U.S. PATENT DOCUMENTS

| | | | | |
|---|---|---|---|---|
| 1,424,775 A * | 8/1922 | Quost | ............... | E04G 11/062 249/156 |
| 3,252,199 A * | 5/1966 | Bossner | ............... | E04B 1/3505 182/128 |
| 3,590,448 A * | 7/1971 | Bryant | ............... | E04G 11/06 264/31 |
| 4,010,580 A * | 3/1977 | Mayr | ............... | E04H 5/12 261/111 |
| 4,060,358 A * | 11/1977 | Fougea | ............... | E04G 11/28 182/128 |
| 4,060,575 A * | 11/1977 | Uhlirsch | ............... | E04H 5/12 248/72 |
| 4,149,351 A * | 4/1979 | Belt | ............... | E04B 1/164 264/32 |
| 4,261,147 A * | 4/1981 | Agsten | ............... | F28C 1/00 261/DIG. 11 |
| 4,388,785 A * | 6/1983 | Queffelec | ............... | E04H 5/12 52/222 |
| 4,439,383 A * | 3/1984 | Collins | ............... | E04B 1/3211 249/184 |
| 4,540,150 A * | 9/1985 | Tzincoca | ............... | E04G 11/28 249/20 |
| 4,553,729 A * | 11/1985 | Connors | ............... | E04G 11/062 249/191 |
| 4,673,159 A * | 6/1987 | Schmidgall | ............... | B28B 7/22 249/102 |
| 4,874,150 A * | 10/1989 | Heinzle | ............... | E04G 11/065 249/144 |
| 4,894,270 A * | 1/1990 | Nicholls | ............... | B28B 1/32 138/146 |
| 5,044,601 A * | 9/1991 | Miller | ............... | E04G 17/001 249/166 |
| 5,086,605 A * | 2/1992 | Tzincoca | ............... | E04G 11/28 249/20 |
| 5,702,627 A * | 12/1997 | Brasken | ............... | E04B 1/7608 249/33 |
| 6,322,043 B1 * | 11/2001 | Saervoll | ............... | E04G 11/087 249/191 |
| 8,256,174 B2 * | 9/2012 | Irniger | ............... | E04H 12/16 52/223.3 |
| 2004/0108444 A1 * | 6/2004 | Cohen | ............... | E02D 5/03 249/170 |
| 2005/0129504 A1 * | 6/2005 | De Roest | ............... | E04H 12/085 415/4.2 |
| 2008/0313972 A1 * | 12/2008 | Grob | ............... | E01D 19/02 52/40 |
| 2015/0247335 A1 * | 9/2015 | Abad Huber | ............... | E04H 12/12 52/223.4 |

FOREIGN PATENT DOCUMENTS

| | | | |
|---|---|---|---|
| GB | 797413 A | 7/1958 | |
| WO | WO 8302974 A1 * | 9/1983 | ............... E04G 9/08 |
| WO | 03/069099 A1 | 8/2003 | |

* cited by examiner

SYSTEM AND METHOD FOR THE CONSTRUCTION OF CONCRETE TOWERS AND RESULTING CONCRETE TOWER

OBJECT OF THE INVENTION

The present invention, as its title indicates, refers to a system and method for building concrete towers based on the use of a modular formwork of constant radius. The towers built according to the invention have a varying cross-section, executed via the positioning and securing of formwork pieces delimiting the outer surface of the section of the tower to be build, regardless of the form or system used to build the inner space of the tower.

The building method of the invention has constructive features aimed to allow, by using a building system composed of a limited number of formwork pieces, forming successive formwork sections in order to build the concrete tower.

The invention also comprises the tower obtained by means of said building method and system.

APPLICATION FIELD OF THE INVENTION

This invention is applicable in the field of building, and more specifically in the building of reinforced concrete or prestressed concrete towers that are preferably suitable, but not limited, to securing different equipment at height, such as wind turbines or others.

BACKGROUND OF THE INVENTION

In certain applications, such as the installation of wind turbines or other elevated equipment, it is common the use of supporting towers that can be made in different materials, usually metal or concrete.

The building processes of both kind of towers are different, as in the case of metal towers, they are built upon cylindrical or conical tubes, while concrete towers can be built from prefabricated parts that are conveniently assembled or are built onsite by using formwork elements to define the shape of the tower and build it by sections, by pouring concrete into the formwork.

Although they are built differently, all existing typologies share a geometrical characteristic, which is that their outer and inner surfaces are mathematically continuous surfaces. Such continuity facilitates attachment of a piece of steel to another, or of a concrete element, either onsite or in a prefabricated way. This feature has defined the geometries of every tower executed until today, including: cylindrical, conical or parabolic shaped towers, either with polygonal sections and/or with mixed polygonal-curved sections.

In the construction work for vertical structures, building systems comprising individual panels that are joined together to form a formwork into which concrete is poured are used. In the case of tall vertical structures, the formwork is made at different stages, using for this the climbing system consisting of uninstall the formwork panels that are situated at lower heights and to install them at an immediately superior height to make the formwork in this new dimension and build an additional tower section, repeating the process until the desired overall height is reached.

As it is known, in the climbing formwork system the panels are mounted on racks or scaffold units which are anchored at the top of the already made section by means of climbing cones. The elevation of the formwork elements from one level to another can be performed using a crane or, in the so-called self-climbing systems, using mechanical or hydraulic lifts.

The construction of concrete structures of constant cross-section, for example cylindrical or prismatic, allows the use of the same panels to conform the formworks for successive sections or levels of the tower; however, the construction of concrete towers or structures of varying cross-section requires the use of formwork panels of different shapes and curvatures for each level or section of the tower to be built. This makes it necessary to have a very large number of formwork panels that must be sufficient to cover the entire surface of the tower to be built, as well as the handling and storage of a large amount of material, which ultimately increases the cost of the work.

It is noteworthy that there are also formwork panels on the market for the construction of conical towers that allow for adjusting their curvature before being assembled and secured; however, this adjustment is particularly difficult, especially when any of the panels has undergone any deformation.

In document WO 03/069099 is described a wind turbine tower consisting of reinforced concrete prefabricated pieces, which are placed next to each other to form a tower of circular or polygonal cross-section.

In document GB 797 413 a cooling tower is described, which is built of prefabricated pieces of concrete or other material, arranged so that together they make up the required shape.

Document CA 1 245 877 relates to a domed construction which is frameless supported and constructed by precast elements joined together.

Document FR12954563 describes a formwork for the construction of cones or truncated pyramids, which includes angle panels of non-parallel sides and intermediate panels in the shape of regular trapezoids arranged between the angle panels, and which is moved at a different speed than those in the formwork of successive sections of the tower, providing a variation of the separation between the side panels.

DESCRIPTION OF THE INVENTION

The system for building concrete towers of this invention, which is of the type used in the by-section building of reinforced or prestressed concrete towers by positioning and fixing formwork pieces delimiting the outer surface of the section of the tower to be built, has constructive features aimed to allow the use of the same pieces for forming the formwork at subsequent sections of the tower by only varying the number of pieces being used.

Another objective of the invention is the development of a method for building concrete towers, that allows, by using the formwork system of the invention and only varying the number of pieces to be used in the casing of each section of the tower to be built, forming frameworks for sections of varying cross-section, both of increasing cross-section and upwardly decreasing cross-section and, when appropriate, forming formworks for tower sections of constant cross-section, so that the surface of the successive sections link together, regardless whether such sections are of varying cross-section or of constant cross-section.

The building system object of the invention allows to produce a tower of a varying number of curved sides, by using the climbing technique and the same pieces for forming successive sections of the tower from a formwork, by only removing one piece of constant width from each section, with the particularity that at least part of the tower sections have a varying cross-section, and that the surface of the tower is not a geometrically continuous surface, since it presents, at each section or lift, clearances or adjustments that are absorbed by the concrete.

Geometrically, the area of the built tower is formed by the intersection of "n" cylindrical areas at each section, where "n" is the number of sides of the tower in question. The tower is obtained with the accumulation of several sections produced in this way one on top of the other.

To this end, and according to the invention, this building system comprises a limited number of equal groups of formwork pieces in accordance with the number of sides or faces of the tower to be built.

Each group of pieces comprises, at least:
  intermediate pieces, with a base, a top end and two parallel vertical sides, said intermediate pieces presenting a curved surface of constant curvature and width along their entire length and,
  end pieces, forming two symmetrical lateral corners having a triangular or trapezoidal outline, provided with a base, an upper apex, a vertical side and an oblique side; said lateral corners presenting: a curved surface with a curvature equal to that of the intermediate pieces, and a decreasing width from the base to the upper apex.

According to the invention, the groups of pieces are dimensioned to form, by combining a varying number of intermediate pieces arranged vertically and laterally attached, a formwork for building a tower section of constant cross-section. By means of the combination of the end pieces and of a varying number of intermediate pieces laterally attached and arranged with a certain inclination with respect to the vertical, a formwork for building tower sections of varying cross-section is formed.

This system allows forming an annular or peripheral surface of the formwork for building a concrete tower section using a combination of intermediate pieces, or by the combination of intermediate pieces and end pieces of each of the groups, and attaching said combinations of pieces by means of conventional techniques.

The combinations formed with each of the groups of pieces of the building system must be the same; each of said combinations of pieces defining the formwork surface corresponding to one of the sides or faces of the section of the tower to be built.

This building system allows, by using a combination of framework, intermediate pieces and end pieces, to define, at each side of the section of the concrete tower to be built, a formwork surface of uniform curvature along said tower section The dimensioning of the pieces of each group is such that the pieces that are used to form the formwork of a first tower section allow to form the formwork for a second section, by simply varying the number of intermediate pieces or end pieces used, or by varying the arrangement of the end pieces used, depending on whether the section to be built is of increasing cross-section or upwardly decreasing cross-section.

Thus, for example:
  by removing intermediate pieces it is possible to define a formwork for a second tower section, which constitutes an extension of the sides of the tower, those section keeping their cross-section variation and the curvature at each of the sides of the tower;
  by reversing the position of the pieces conforming the end corners, it is possible to define a formwork for a first section and a formwork for a second section, the cross-sections of which increase in opposite directions, said sections being opposed by their larger cross-section ends or by their smaller cross-section ends, with the sides defined by said formwork remaining vertically aligned in the subsequent tower sections, and
  by eliminating the pieces conforming the corners, it is possible to conform, after a tower section of (convergent or divergent) varying cross-section, the formwork for a second section of uniform cross-section.

In one embodiment of the invention, the oblique side and the base of the lateral corners that are formed by the end pieces, define a varying angle between them, according to the inclination the formwork must have with respect to the vertical, and consequently of the angle of convergence of the outer surface of the tower to be built.

According to the invention, the base of the lateral corners presents the same length as the base of one of the intermediate pieces, or the sum of the bases of two or more intermediate pieces, thereby eliminating in the formwork for a second tower section, part of the intermediates pieces used in the formwork for a first section and that the length or curved perimeter of the bases of the pieces conforming that second formwork meet the length or curved perimeter of the top end of the intermediates pieces used in the formwork for the first section.

This invention also includes a method for building concrete towers by using the above mentioned building system.

This building method comprises the following steps:
a) providing "n" equal groups of formwork pieces, including: intermediate pieces having a curved surface of constant curvature and width along their length and end pieces of triangular or trapezoidal outline with a curved surface of curvature equal to that of the intermediate pieces, and a decreasing width from the base to the upper apex;
b) arranging, in an orderly way, the end pieces and a specified number of intermediate pieces of each of the groups, thus forming a first formwork section of annular configuration, with "n" faces or sides, with the same curvature and the same inclination, the said first formwork section presenting a height-proportional cross-section variation;
c) building a first section of tower by pouring concrete into the first formwork section, wherein reinforcement frames have been previously inserted;
d) lifting the pieces conforming the first formwork section to a second level, eliminating from every formwork side the same number of intermediate pieces or end pieces, forming a second formwork section of annular configuration, with "n" faces or sides, same curvature and same inclination, said second formwork section constituting an extension of varying or constant cross-section of the first section of the tower;
e) building a second tower section by pouring concrete into the second formwork section; and
f) repeating steps d) and e) until reaching the desired height of the tower.

According to the invention, the concrete tower, built with the building system and method described above, has constructive and structural characteristics that are clearly different from those of the currently existing towers, wherein all the sides of the tower are curves of constant radius and the cross-section of the tower varies proportionally with the height.

This concrete tower comprises a varying number of sides of constant curvature, formed by respective consecutive sections, at different levels, formed by the intersection of "n" cylindrical surfaces inclined at the same angle at each level and whose intersection defines ridges describing a polygon, where "n" is the number of sides of the concrete tower.

In this invention, the concrete tower has at least one section whose cross-section varies in an increasing or decreasing way in proportion with the height, it being provided that the tower may comprise, in combination with said section or sections of varying cross-section, at least one section of constant cross-section, which is connected, at least at one end thereof, with one of said sections of varying cross-section.

DESCRIPTION OF FIGURES

In order to complement the description that is being carried out and with the purpose of facilitating the understanding of the characteristics of the invention, the present description is accompanied by a set of drawings wherein, by way of a non-limiting example, the following has been represented.

PREFERRED EMBODIMENT OF THE INVENTION

Figure 1A:
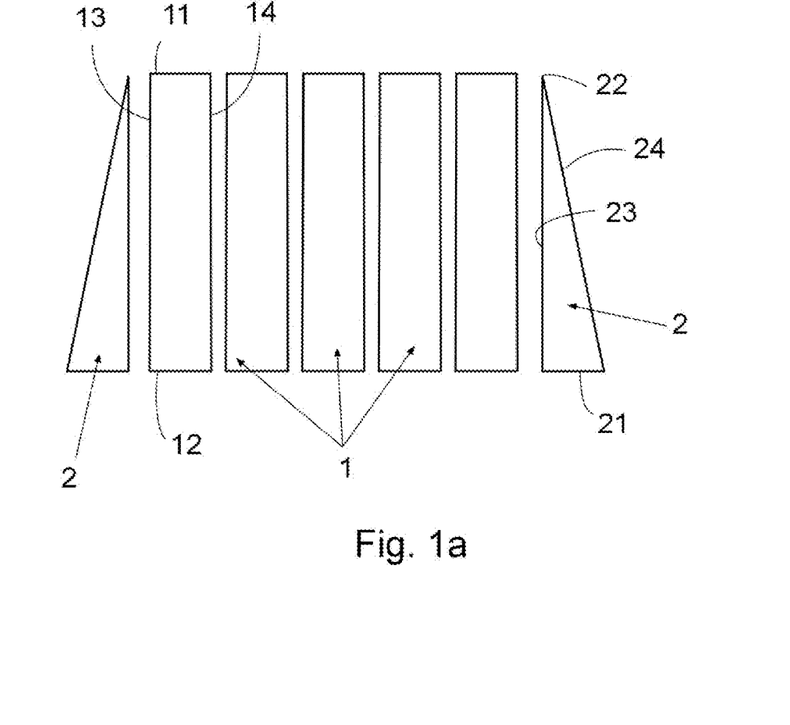
FIGS. 1a and 1b show elevational views of any one of the groups of pieces (1, 2) constituting the formwork building system, spaced and laterally attached, respectively.
Figure 1B:
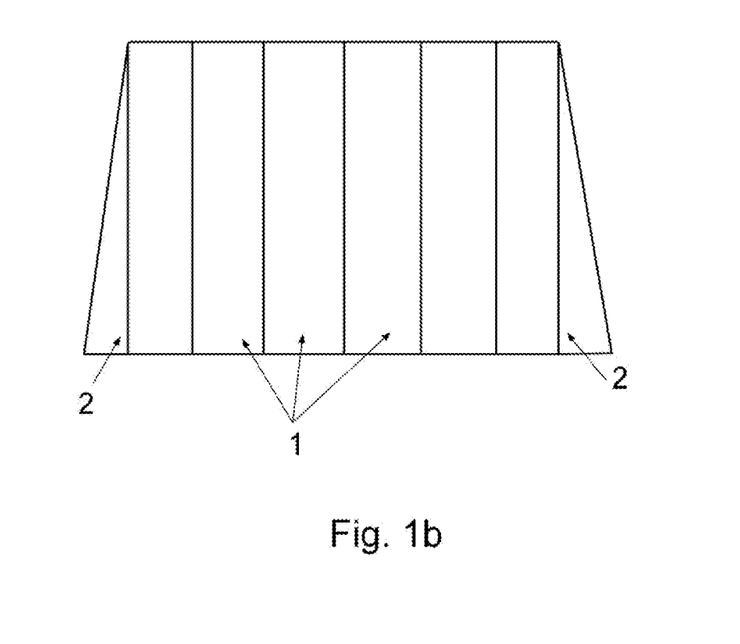

In the embodiment shown in FIGS. 1a and 1b, one of the same groups of pieces (1, 2) constituting the formwork building system, obtained in this case from a cylindrical segment of metal sheet, having an amplitude of 360/n degrees, where "n" is the number of faces of the tower (T) to be built, is observed.

Figure 2:
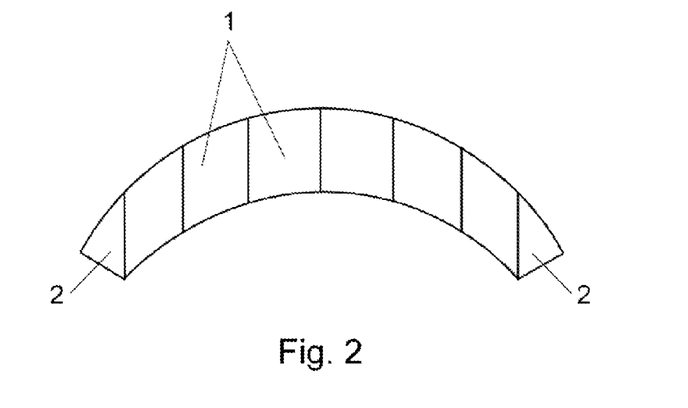
FIG. 2 shows a top plan view of the group of pieces of the previous figure, formed from a cylindrical segment of metal sheet.

In the specific case shown in FIGS. 1a, 1b and 2, the group of pieces (1, 2) suitable for forming a three-sided tower, has an amplitude of 120'.

Figure 3:
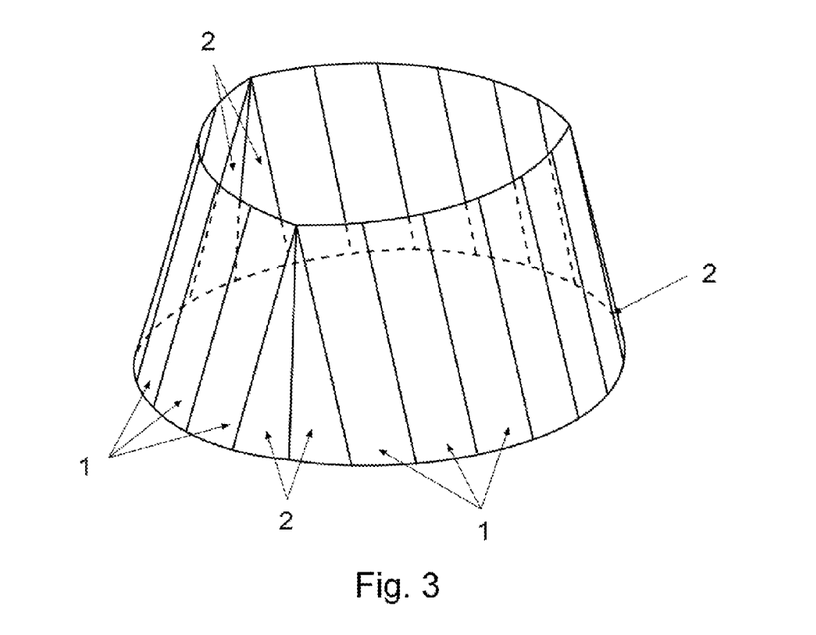
FIGS. 3 and 4 show a perspective view and a top plan view of three groups of pieces, forming a formwork section.

The intermediate pieces (1) and the end pieces (2), are arranged, during the building, with a certain inclination relative to the vertical and are cut by their upper and lower ends following both horizontal planes, thus adopting the configuration shown in FIG. 3.

The intermediate pieces (1) having a base (11), an upper end (12) and two parallel vertical sides (13, 14), present a curved surface, as a cylindrical segment, and a constant width along the entire length thereof.

As it can be seen in FIGS. 1a and 1b, the end pieces (2) are cut in an oblique direction, forming two symmetrical lateral corners, in this case of triangular outline, with a base (21), an upper vertex (22), a vertical side (23) and an oblique side (24).

Said lateral corners, which are formed by the end pieces (2), define a curved surface of the same curvature as that of the intermediate pieces (1) and of a decreasing width from their base (21) to their upper apex.

Figure 4:
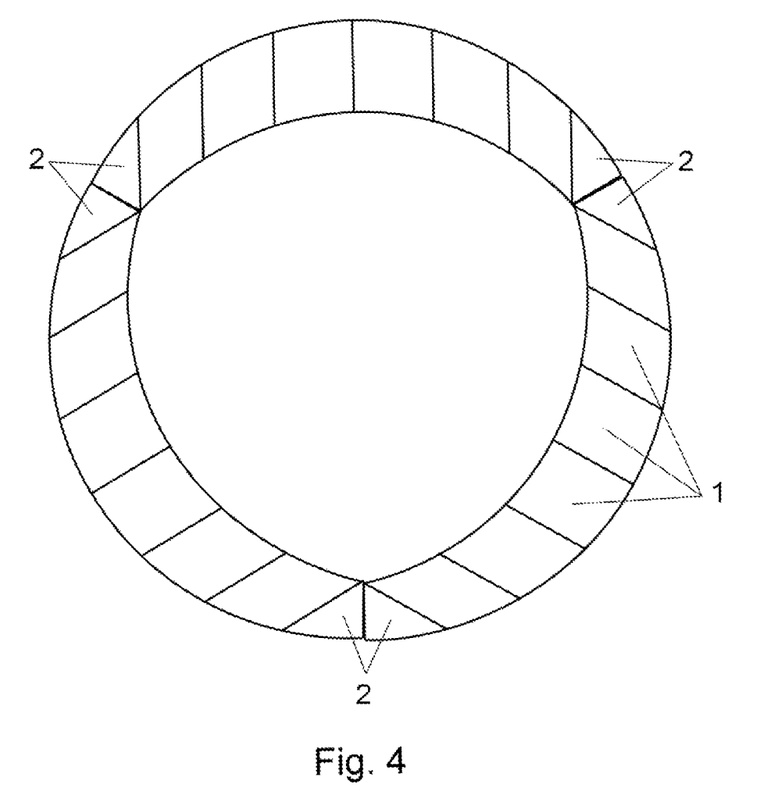
Figure 5:
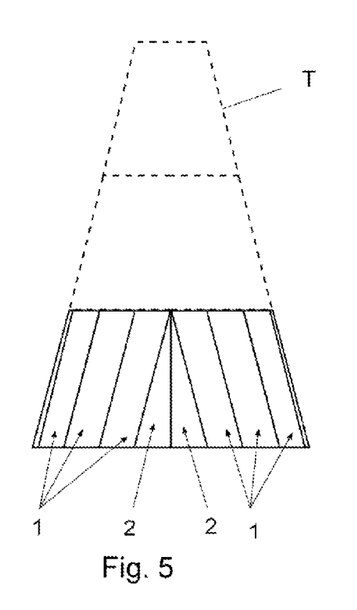
FIGS. 5, 6 and 7 schematically show successive steps of the by-section building of a concrete tower, by means of the building system and method of the invention.

As it can be seen in FIGS. 3, 4 and 5, by conveniently arranging "n" equal combinations with a certain number of intermediate pieces (1) and end pieces (2), and by suitably attaching them by known formwork techniques, it is possible to form a formwork of annular configuration and varying cross-section, for building a first section of a "n"-sided tower "T" and of decreasing cross-section, in this case, wherein each of the sides of the formwork present a constant curvature along the entire length thereof.

Figure 6:
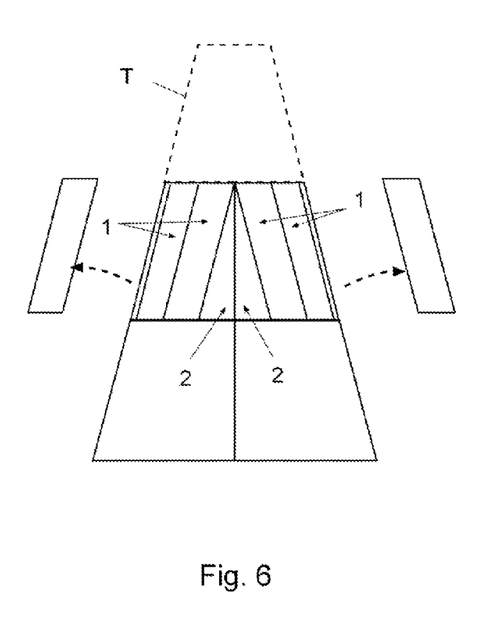

As shown in FIG. 6, once the first section of the tower (T) is built by pouring concrete within a space delimited by the formwork shown in Figure (3) and an inner—not shown—formwork, the casting of a second section is made with the same groups of pieces (1, 2), previously used, it being sufficient to remove, from every side of the prior formwork, one of the intermediate pieces (1) for this purpose, so that this second section or lift presents a base, which engages with the upper end of the previously built section of the tower (T) that is immediately below.

Figure 7:
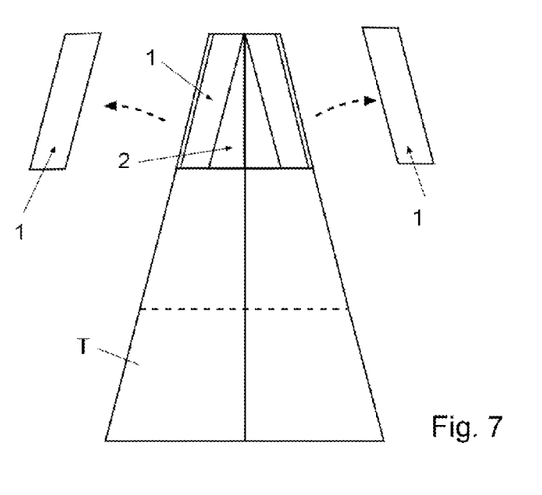

By repeating this operation of removing the intermediate pieces (1) the forming is achieved, with the same initial groups of pieces (1, 2), of a formwork for building a third section of the tower, as shown in FIG. 7, and of consecutive sections until reaching the full height thereof.

The geometry generated in this way has several distinctive features. The curved sides do not make up a mathematically continuous surface, since at each junction between consecutive formwork sections or lifts is a small horizontal gap.

Figure 8:
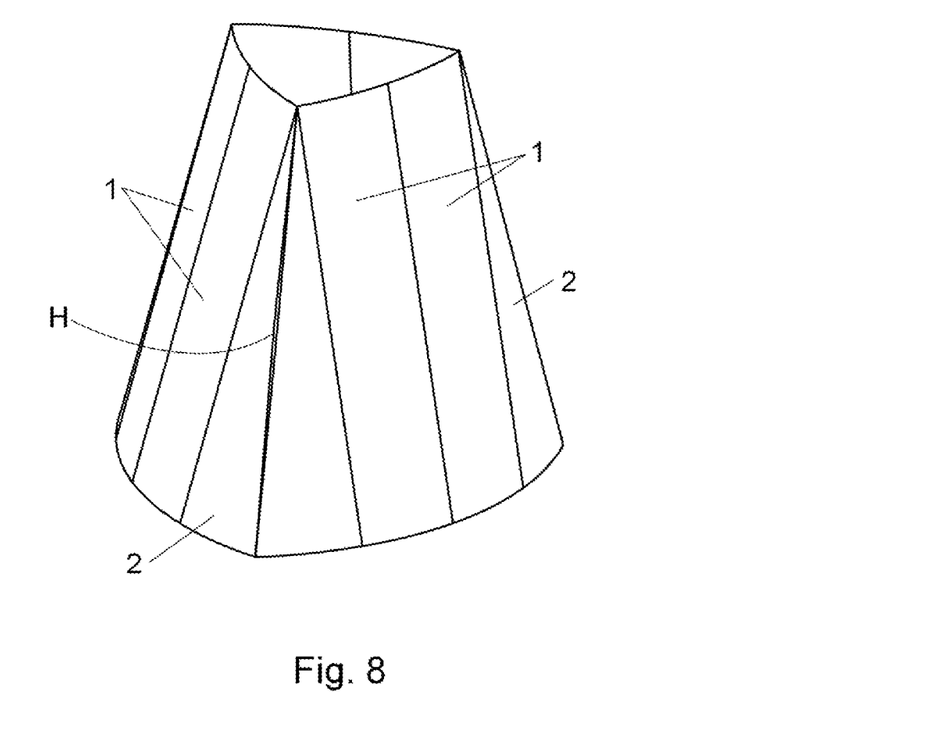
FIG. 8 shows a perspective view of a formwork section, wherein the spaces defined between two consecutive sides of the formwork section can be seen.

The corners of each section have an angle that varies with height, which also means a small clearance (H) between the adjoining sides of the formwork, as seen in FIG. 8. This clearance (H) that results from the fact that the corners of the formwork are obtained by cutting a cylinder by an oblique plane and are therefore segments of an ellipse.

These segments fit perfectly into the base or lower level of the tower, but as pieces are removed and an angle between the sides of the formwork is produced, they are separated in the middle part, thus causing the aforementioned clearance (H).

These features make the system object of the invention not applicable for making a steel tower, as pieces having the same geometry as the formwork elements could not be joined; however, the characteristics of the concrete will absorb these gaps keeping the functionality of the structure.

A tower without gaps could not be made by joining pieces that are identical to those used in the formwork, but the fact of building on a by-section basis allows the concrete to absorb these gaps and make the tower.

Figure 12:
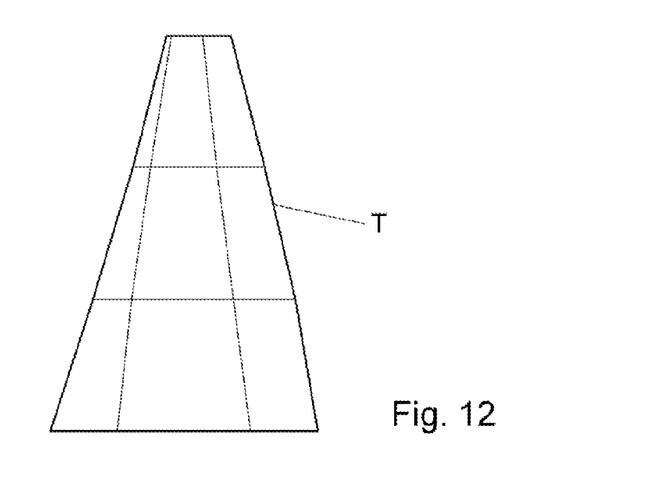
Figure 15:
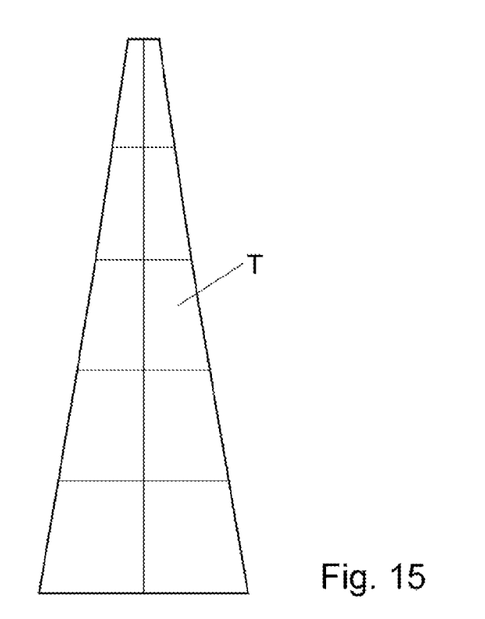

As it is shown and can be seen more clearly in FIGS. 12 and 15, the slope of each of the sides of the tower (T) obtained with the invention, is varying, which together with the process of modification of the formwork, makes that every formwork cannot physically engage with the tower section previously built.

Figure 9:
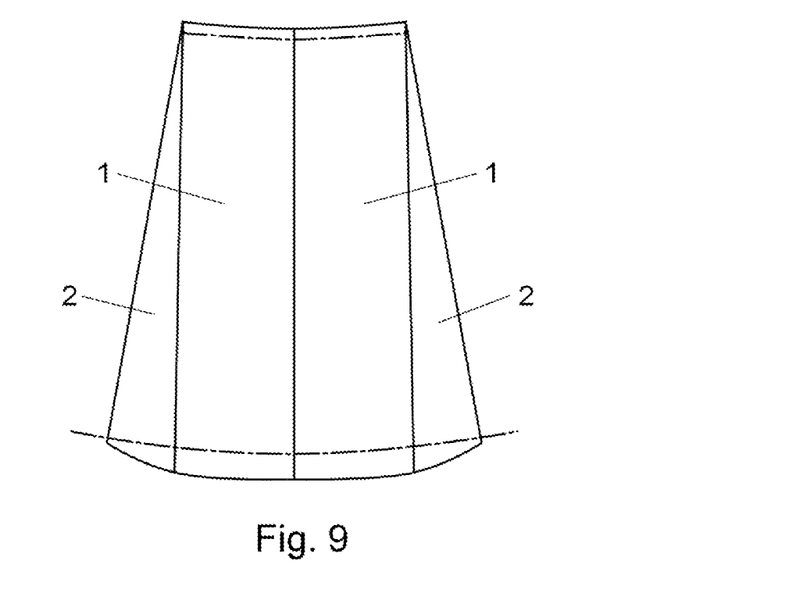
FIG. 9 shows a schematic view of one of the sides of a formwork section positioned on a lower section of the tower being built, showing the top and bottom casting levels.

This is solved by casting, from a level slightly above the lower edge of the corresponding formwork section, without reaching the upper edge thereof, as shown in FIG. 9, where the lower and upper levels are shown with the two dashed lines on one of the formwork sides.

Figure 10:
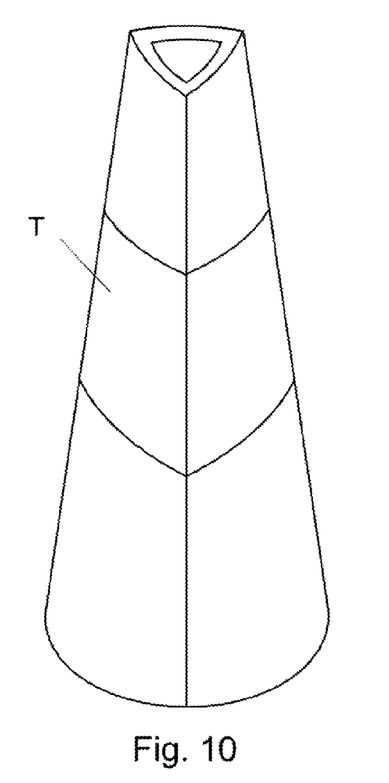
FIGS. 10, 11 and 12 show a perspective view, a top plan view and an elevational view of an embodiment of a three-sided concrete tower, with three sections and varying cross-section, according to the invention.
Figure 11:
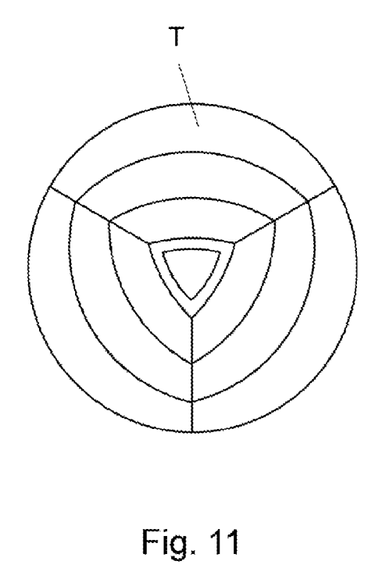
Figure 13:
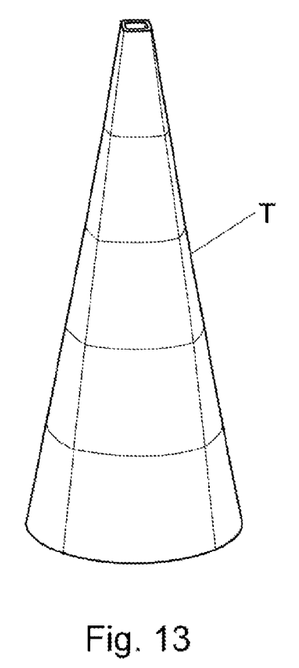
FIGS. 13, 14 and 15 show a perspective view, a top plan view and an elevational view of an embodiment variant of a four-sided tower with five sections, according to the invention.
Figure 14:
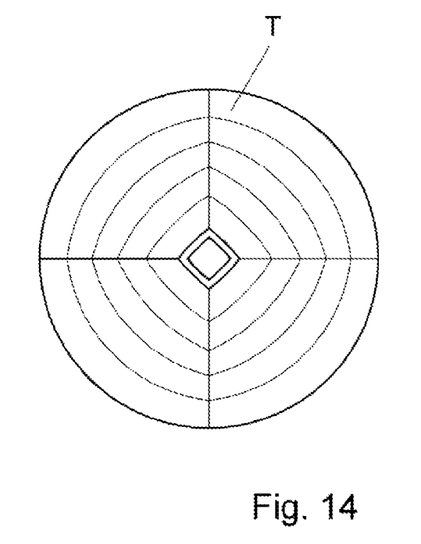

Using the indicated method and providing the intermediate pieces (1) and the end pieces (2) with appropriate dimensions and curvatures, it is possible to form three-sided towers, as shown in FIGS. 10, 11 and 12, or towers with a different number of sides and sections, for example four sides and five sections, as shown in FIGS. 13, 14, and 15, or even more.

It should be mentioned that the inner outline of such towers may vary and be built with different types of formwork, and that the outer outline thereof is formed, in any horizontal plane, by "n" arcs of an ellipse.

It is important to note that the intermediate pieces (1) of this building system are different from one another, because their upper and lower edges are different depending on their position within the formwork.

Figure 16:
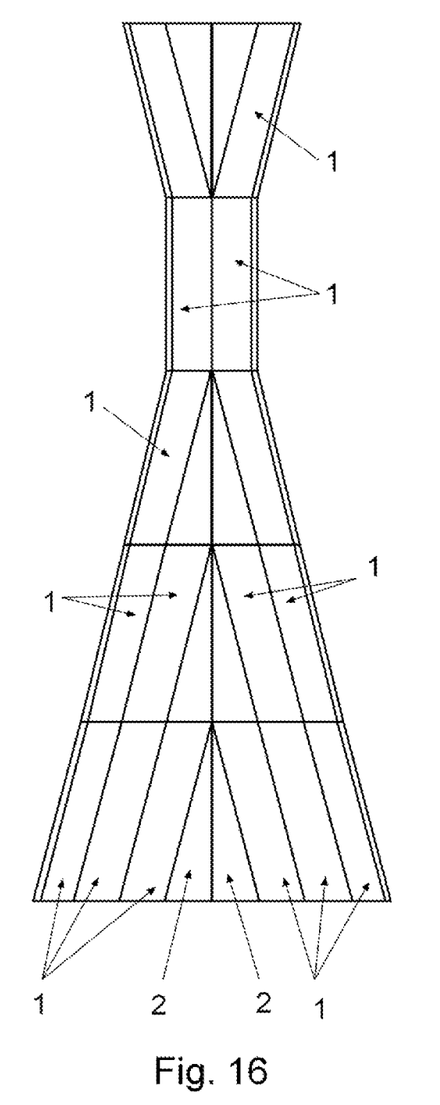
FIG. 16 shows an elevational view of the groups of pieces of the building system of the invention, arranged in three possible positions for forming tower sections of decreasing cross-section, of constant cross-section and of increasing cross-section, seen in an upward direction.

Regardless of the "n" number of sides of the tower to be built, this formwork is suitable to allow forming, with a limited number of groups of pieces, successive formworks for tower sections of decreasing cross-section, as in the example discussed above, or successive formwork for building sections of constant cross-section connected to convergent or divergent sections, as shown in FIG. 16.

Forming formworks for sections of constant cross-section is achieved by using only intermediate pieces (1) that are vertically arranged; whereas the formwork for sections of increasing cross-section, as the one shown at the top of FIG. 16, is achieved by combining intermediate pieces with end pieces (2), the latter being arranged so that the lateral corners are in an inverted position.

Once the nature of the invention as well as an example of preferred embodiment have been sufficiently described, it is stated for all pertinent purposes that the materials, form, size and arrangement of the elements described are susceptible to changes, provided these do not involve an alteration of the essential characteristics of the invention that are claimed subsequently.

The invention claimed is:

1. System for building concrete towers applicable in the by-section construction of reinforced or prestressed concrete towers comprising a plurality of equal groups of formwork pieces, which are configured to allow the formation of successive formwork sections, and which delimit an outer surface of a section of the tower to be built, said plurality of equal groups being equal to the number of sides or faces of the tower to be built, wherein each group of pieces comprises:

a plurality of intermediate pieces, having a base, a top end, and two parallel vertical sides, said intermediate pieces providing a curved surface of constant curvature and width along the entire length thereof and, a plurality of end pieces, forming two symmetrical lateral corners having a triangular or trapezoidal outline, wherein the end pieces have a base, an upper apex, a vertical side and an oblique side; said lateral corners providing: a curved surface having the same curvature as that of the intermediate pieces, and a decreasing width from the base to the upper apex; and the oblique side and the base of the lateral corners, formed by the end pieces, define an angle between them that corresponds to the angle of inclination of the sides of the tower to be built; and the base of the lateral corners, formed by the end pieces, provide the same length as the base of one of the intermediate pieces, or the sum of the bases of two or more intermediate pieces; said groups of pieces being dimensioned to form, by combining a plurality of intermediate pieces, arranged vertically and laterally attached, the sides of a formwork for building a section of a tower of constant cross-section; and to form, by means of the combination of the end pieces and of a varying number of intermediate pieces laterally attached and arranged with a certain inclination with respect to the vertical, sides of a formwork for building a section of a tower of varying cross-section.

2. A method for building a concrete tower having "n" sides, comprising the steps of:
 a) providing "n" groups of formwork pieces, wherein each group comprises a plurality of end pieces and a plurality of intermediate pieces having a curved surface of constant curvature and width along the entire length thereof, and
 b) arranging the intermediate pieces in side-by-side relationship;
 c) arranging a first end piece at a first end of the intermediate pieces and a second end piece at a second end of the intermediate pieces to side of formwork wherein the end pieces are of triangular or trapezoidal outline with the same curved surface of curvature as that of the intermediate pieces, and a decreasing width from the base to an upper apex;
 d) repeating steps a-c "n" times to form "n" sides of formwork;
 e) connecting the "n" sides of formwork to form a first formwork section of annular configuration, with "n" of faces or sides, with the same curvature and the same inclination the first formwork section presenting a height-proportional cross-section variation;
 c) building a first tower section by pouring concrete into the first formwork section;
 d) lifting the formwork pieces of the first formwork section to a second level, eliminating from each formwork face, the same number of intermediate pieces or end pieces, thereby forming a second formwork section of annular configuration, with "n" faces or sides, the same curvature and the same inclination as the first formwork section, said second formwork section-constituting an extension of varying or constant cross-section of the first section of the tower;
 e) building a second tower section by pouring concrete into the second formwork section; and
 f) repeating steps d) and e) until reaching the desired height of the tower.

3. The method for building a concrete tower according to claim 2, wherein said tower comprises "n" sides of constant curvature, formed by respective consecutive sections, at different levels, formed by the intersection of "n" cylindrical surfaces inclined at the same angle at each level and whose intersection defines ridges describing a polygon.

4. The method for building a concrete tower according to claim 3, wherein the tower comprises a section having a cross-section that varies in an increasing or decreasing way in proportion with its height.

5. The method for building a concrete tower according to claim 3, wherein the tower comprises a section of constant cross-section having an end connected with a a section of varying cross-section.

6. A system for building reinforced or prestressed concrete towers, comprising:

a plurality of groups of formwork pieces, wherein each group is configured to form successive formwork sections, wherein each group delimits an outer surface of a section of the tower to be built and wherein the number of groups is equal to the number of sides or faces of the tower to be built, wherein each group of formwork pieces comprises:

a plurality of substantially similar intermediate pieces arranged in side-by-side relation, wherein each intermediate piece has a base, a top end and two parallel vertical sides;

a plurality of end pieces, wherein a first end piece is disposed at a first end of the group of formwork piece and a second end piece is disposed at a second end of the group of formwork pieces;

wherein all of the formwork pieces between the first and second end pieces are intermediate pieces and wherein the intermediate pieces provide a curved surface of constant curvature and width along the entire length thereof and, wherein the end pieces form two symmetrical lateral corners having a triangular or trapezoidal outline, wherein the end pieces have a base, an upper apex, a vertical side and an oblique side; said lateral corners providing: a curved surface having the same curvature as that of the intermediate pieces, and a decreasing width from the base to the upper apex; and the oblique side and the base of the lateral corners, formed by the end pieces, define an angle between them that corresponds to the angle of inclination of the sides of the tower to be built; and the base of the lateral corners, formed by the end pieces, provide the same length as the base of one of the intermediate pieces, or the sum of the bases of two or more intermediate pieces;

wherein the plurality of groups are arranged to form the sides of a formwork for building a section of a tower of constant cross-section.

\* \* \* \* \*

UNITED STATES PATENT AND TRADEMARK OFFICE
CERTIFICATE OF CORRECTION

| | | |
|---|---|---|
| PATENT NO. | : 9,487,966 B2 | Page 1 of 1 |
| APPLICATION NO. | : 14/761659 | |
| DATED | : January 10, 2017 | |
| INVENTOR(S) | : Francisco Ballester Muñoz | |

It is certified that error appears in the above-identified patent and that said Letters Patent is hereby corrected as shown below:

In the Claims

Claim 2 should read as:

2. A method for building a concrete tower having "n" sides, comprising the steps of:
a)      providing "n" groups of formwork pieces, wherein each group comprises a plurality of end pieces and a plurality of intermediate pieces having a curved surface of constant curvature and width along the entire length thereof, and
b)      arranging the intermediate pieces in side-by-side relationship;
c)      arranging a first end piece at a first end of the intermediate pieces and a second end piece at a second end of the intermediate pieces to side of formwork, wherein the end pieces are of triangular or trapezoidal outline with the same curved surface of curvature as that of the intermediate pieces, and a decreasing width from the base to an upper apex;
d)      repeating steps a-c "n" times to form "n" sides of formwork;
e)      connecting the "n" sides of formwork to form a first formwork section of annular configuration, with "n" of faces or sides, with the same curvature and the same inclination the first formwork section presenting a height-proportional cross-section variation;
f)      building a first tower section by pouring concrete into the first formwork section;
g)      lifting the formwork pieces of the first formwork section to a second level, eliminating from each formwork face, the same number of intermediate pieces or end pieces, thereby forming a second formwork section of annular configuration, with "n" faces or sides, the same curvature and the same inclination as the first formwork section, said second formwork section constituting an extension of varying or constant cross-section of the first section of the tower;
h)      building a second tower section by pouring concrete into the second formwork section; and
i)      repeating steps g) and h) until reaching the desired height of the tower.

Signed and Sealed this
Sixth Day of June, 2017

Michelle K. Lee
*Director of the United States Patent and Trademark Office*